A. BECKERS
Stereoscope.
No. 16,962.
Patented April 7, 1857.
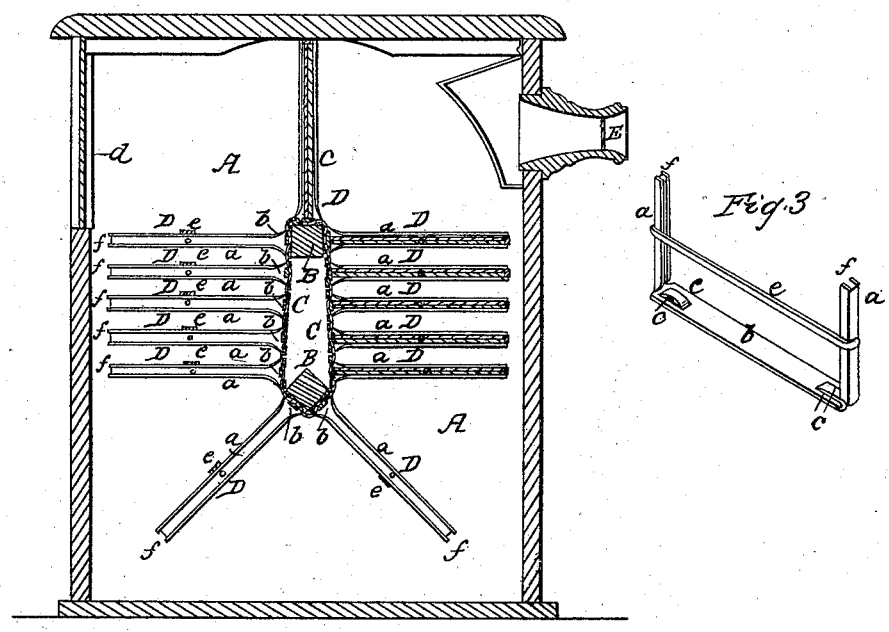
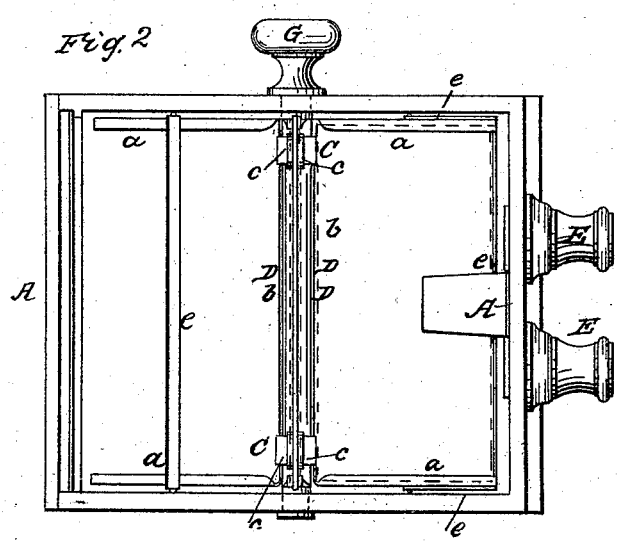

UNITED STATES PATENT OFFICE.

ALEX. BECKERS, OF NEW YORK, N. Y.

APPARATUS FOR EXHIBITING STEREOSCOPIC PICTURES.

Specification forming part of Letters Patent No. 16,962, dated April 7, 1857; Reissued January 31, 1860, No. 890.

*To all whom it may concern:*

Be it known that I, ALEXANDER BECKERS, of the city, county, and State of New York, have invented a new and useful Apparatus for Exhibiting Stereoscopic and other Pictures; and I do hereby declare that the following is a full, clear, and exact description of the same, reference being had to the accompanying drawings, making a part of this specification, in which—

Figure 1 is a vertical section of the apparatus, at right angles to the plane of the pictures. Fig. 2 is a plan of the same with the cover removed to show the interior. Fig. 3 is a perspective view of one of the slides which receive the pictures.

Similar letters of reference indicate corresponding parts in the several figures.

This apparatus consists in an endless belt, chain, or apron, having a series of frames or slides to receive pictures, attached to it in such manner as to stand perpendicular to its face, and arranged within a box or chamber in such manner that by moving it, the pictures may be presented successively in a vertical or other suitable position opposite to magnifying glasses or other transparent media, or to suitable openings, to be exposed to view.

By the arrangement of the pictures at right angles to the face of the belt, chain, or apron as above-mentioned, a larger number of pictures may be contained or exhibited in a box or chamber of a given size than by the arrangement of the same parallel with the face of the belt, chain or apron, as is usual in moving panoramas; and the pictures are moved to be exposed to view in a more convenient manner than when the pictures slide separately into a box as in the common mode of exhibiting stereoscopic photographs.

To enable others skilled in the art to make and use my invention, I will proceed to describe its construction and operation.

A, is a quadrangular box, in the sides of which are the bearings for the journals of two horizontal rollers B B, which are placed one above the other and parallel with each other, and extend the whole width of the box. These rollers should be preferably square, but may be of other polygonal form. C C, are two endless belts of webbing or other strong material placed near the ends of the rollers and intended to have a piece of dark colored cloth or other material stretched across them to form an endless apron of the whole width of the box; but this cloth is omitted in the drawing to leave exposed the two belts and show the manner of attaching the slides which receive the pictures.

D D, are the slides, which I generally construct of a slip of tin plate or other sheet metal, of a length equal to the length of the pictures added to twice the height thereof and of a width equal to the width of the sides of the rollers, by bending a piece $a, a,$ at each end, of a length equal to the height of the pictures, at right angles to the central portion, and turning inward the edges of the pieces $a, a,$ to form two grooves of a sufficient width for the pictures to slide into; and I attach the central straight part ($b$) to the two belts C, C, by cutting two slits $c, c,$ at a suitable distance from each of the bends, as shown in Fig. 3, for the belts to pass through, and, after passing the belts through the said slits, clamping the metal upon the belts. The slides, thus constructed and secured to the belts, hold the pictures at right angles to the face of the belts and apron and cause each picture, when it is brought to its highest or lowest position by the movement given to the belts or apron by turning the rollers,—to stand vertical, as illustrated in Fig. 1, where a slide is shown in a vertical position above the upper roller, opposite to two eye-glasses E E. The pictures are shown in section in Fig. 1, and in outline in Fig. 2, in red color, fitting to the grooved parts $a, a,$ of the slides.

$e, e,$ are straps of india-rubber, or other elastic material, attached at their ends to the exterior side-pieces $a, a,$ of the slides, some distance from the ends thereof, for the purpose of confining the pictures in the slides, and preventing them from falling out when the slides are inverted below the bottom roller. These straps, when the pictures are in the slides, are drawn over the tops of the slides as shown at the right hand of the apron in Figs. 1 and 2, and rest on the top or outer edge of the picture. Notches, $f, f,$ are provided in the ends of the grooved parts $a, a,$ of the slides, to prevent the straps slipping off the pictures. When it is desired to remove the pictures from the slides, the straps $e, e,$ are pulled out of the notches $f, f,$ and their elasticity draws them over against the sides of the parts *a, a,* of the slides, as shown at the left hand of Figs. 1 and 2.

The particular example of my apparatus that I have represented is intended for the exhibition of photographic pictures on glass, and consequently the light is admitted to the box by a glass *d*, in the back of the box; but in an apparatus for the exhibition of pictures on any opaque material, the light would be admitted at the top of the box.

The belts C C, are moved to present the pictures successively in a vertical position opposite the glasses E E, by turning a handle G, that is attached to one end of one of the rollers outside the box. The picture which is in this position is held steady by resting on the broad part or foot *b*, of the slide which rests on the flat surface of the roller; and it is to insure steadiness of the pictures that the rollers are made of square or other polygonal form.

The example of my invention shown in the drawing is constructed for a small number of pictures only, but it will be understood, on reference to the parallel positions of the belts or apron in Fig. 1, that the number of slides may be greatly increased without adding much to the height of the box. In this economy of space consists the superiority of the apparatus.

If desired, the pictures may be exhibited below the lower, instead of above the upper roller. This arrangement would perhaps be most convenient in a very high box to contain a large number of pictures.

I do not claim, broadly, the attachment of stereoscopic pictures to endless belts, for such contrivances are well known to daguerrian artists. A description of an apparatus of this kind may be found in the Liverpool & Manchester Photographic Journal, new series, No. 1, page 1. In this device, the pictures are attached to each other by their edges, like the cards in a Jacquard loom, and form or lie flat upon an endless belt. But in my apparatus, the pictures are arranged at right angles to the face or line of motion of the belt, cord, or chain, which is an important improvement over the above-described plan, for the following reasons: In my apparatus, the pictures are packed horizontally one over the other, instead of being spread out separately. My pictures only require one inch each of box elevation for their accommodation. But the old plan requires box elevation for each picture in proportion to its width. Thus if the pictures are each six inches wide, each will require six inches elevation of the case; whereas by my plan, six pictures may be accommodated in a height of six inches. If twelve pictures, each six inches wide, are to be exhibited, on the old plan, a case 3 feet high will be required. By my arrangement, seventy two pictures can be packed in a case having the same elevation.

Another disadvantage of the old plan is that the pictures can be exhibited by reflected light only. But in my plan the light is directly transmitted through the back of the plate or picture. The pictures are thus better lit up than they can be by reflected light. Reflected light can also be thrown down upon the picture in front, through the roof of my apparatus, when desirable.

The reason why reflected light only can be used in the old plan is because the pictures are arranged flat-wise upon the belt, and stand in each other's way. The plates are thus always opposite; the back plate preventing the transmission of light through the front one. It is therefore customary to have an opening in the side of the box, and introduce reflectors in the center of the belt, in order to throw the light against the back of the plate which is under exhibition. The inner end of the picture is thus more dimly lighted than the end nearest the opening in the box.

The old apparatus is defective for the exhibition of opaque pictures and daguerreotypes, because the light cannot be readily thrown in upon the front of the picture. No difficulty of this sort attends the use of my improvement. It can be used for the exhibition of all kinds of stereoscopic pictures with equal advantage. In my instrument, the pictures may also be more easily inserted and removed than when they are attached together by their ends or secured flatwise to an endless belt.

Having thus described my invention, what I claim, and desire to secure by Letters Patent, is:

1. Arranging the pictures at right angles to the endless belt, in the manner and for the purposes substantially as herein described.

2. The within-described mode of securing the pictures in the grooved slides by means of the elastic bands *e, e,* and notches *f, f,* in the ends of the grooved portions of the slides.

ALEX. BECKERS.

Witnesses:
W. TUSCH,
J. F. BUCKLEY.

[FIRST PRINTED 1912.]